Figure 1:
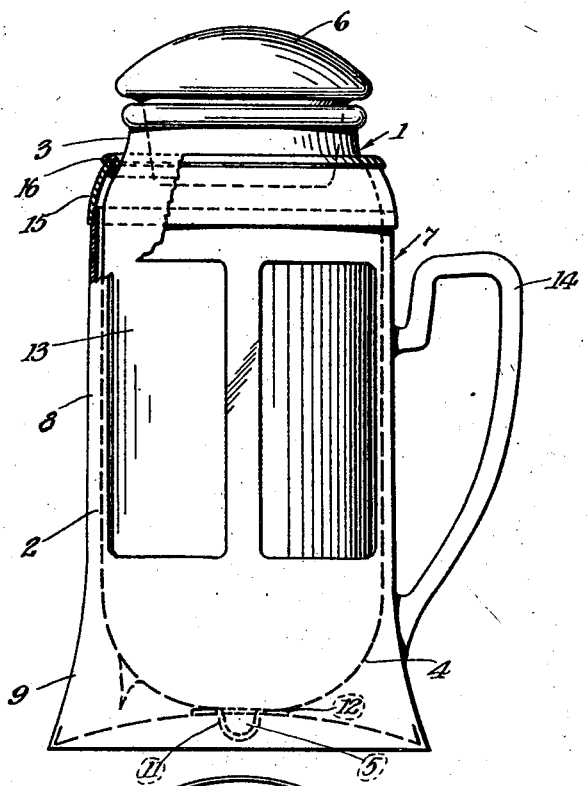

Dec. 23, 1924.

C. E. BULTMAN

CONTAINER

Filed Nov. 10, 1922

1,520,118

Inventor
Charles E. Bultman

Patented Dec. 23, 1924.

1,520,118

UNITED STATES PATENT OFFICE.

CHARLES E. BULTMAN, OF CHICAGO, ILLINOIS; IDA MAI BULTMAN EXECUTRIX OF SAID CHARLES E. BULTMAN, DECEASED.

CONTAINER.

Application filed November 10, 1922. Serial No. 600,152.

*To all whom it may concern:*

Be it known that I, CHARLES E. BULTMAN, a citizen of the United States, residing at Chicago, in the county of Cook and State of Illinois, have invented new and useful Improvements in Containers, of which the following is a specification.

The invention broadly concerns containers and more particularly insulated vessels which are adapted to maintain the contents without any appreciable change in temperature for a considerable length of time.

It is an object of the invention to provide a container which may be conveniently arranged on a table and is constructed to permit convenient handling when used for serving the contents.

A further object aims at providing a container which is arranged in a casing and yet meets all requirements in sanitary respects.

It is also an object to limit the contact between casing and container to an irreducible minimum so that dissipation of heat by conduction is practically eliminated.

A still further object constitutes the provision of a container which forms an ornament on a table and yet is distinguished by its efficiency and usefulness.

Another object aims at providing a casing which permits access to the container proper, and which is composed of a body portion in threaded engagement with a collar bearing with the upper end on the neck of the container.

It is a still further object to provide certain features of construction and arrangement tending to enhance the ornamental appearance and the usefulness of the device.

With these and other objects in view the invention comprises the means hereinafter described, particularly pointed out in the claims, and illustrated in the drawing, in which—

Figure 2:
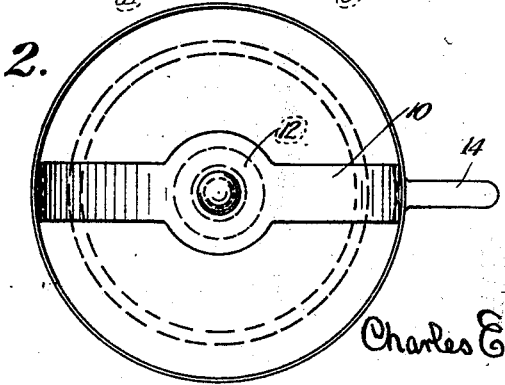

Fig. 1 is a side view of a container constructed in accordance with my invention, parts being broken away to disclose interior construction, and Fig. 2 is a bottom plan view.

Referring to the drawing, 1 designates a container which by way of example may be a vacuum insulated vessel known as a thermos bottle. This container comprises the body portion 2, the neck 3, and the bottom 4 terminating in a semi-spherical protuberance 5. The particular construction of the container or the provision of the protuberance are matters foreign to the invention, but are more fully set forth in my copending application Serial #582,962, filed August 19th, 1922.

The container is closed by a stopper 6 of any suitable or required construction. A casing generally designated by 7 is employed in connection with the container.

The casing comprises a cylindrical portion 8 which terminates at the lower end in a flaring portion 9 so that the container is held in stable equilibrium. The bottom of the flaring portion has a diametrically extending strip 10 which is enlarged at the center and formed with a semi-spherical socket 11.

The gasket 12 of resilient material is interposed between the container and the strip 10 so that the protuberance 5 entering the socket 11 does not actually contact with the wall thereof.

The cylinder 8 has a plurality of windows 13 to expose the container and to enhance the ornamental features thereof. A hande 14 formed integral with the cylinder 8 or made separate and secured to the cylinder permits convenient handling of the device. The upper end of the cylinder has exterior threads and a collar 15 is screwed onto the cylinder and engages with the upper end a ring 16 receiving the collar edge in a circumferential groove. The ring 16 bears on the neck of the container and so prevents the contents of the container to enter the space between the casing and the container. Attention is called to the fact that the casing is formed in the manner of a cage to protect the frangible container against breakage but otherwise granting access to the container from all sides.

The device is particularly designed to be used as a food or beverage container for individual use. It may be conveniently handled, easily cleaned and readily assembled or taken apart. The container thus admirably meets all requirements for household purposes and in addition is an attraction.

I claim:

1. In combination with a container, a cylindrical casing surrounding said container and maintaining a distance therefrom, said casing being formed with a series of elongated openings and terminating in a flaring bottom portion, a strip diametrically extending at the bottom of said casing and supporting at its center said container and a collar in threaded engagement with the upper end of said casing and bearing on the neck of said container.

2. In combination with a container, a cylindrical casing surrounding said container and maintaining a distance therefrom, said casing being formed with a series of elongated openings and terminating in a flaring bottom portion, a strip diametrically extending at the bottom of said casing and supporting at its center said container, a gasket interposed between said strip and said container, and a collar in threaded engagement with the upper end of said casing and bearing on the neck of said container.

3. For use with a container, a cylindrical cage loosely surrounding said container and being open at the top and bottom, said cage terminating in a flaring bottom portion, a strip diametrically extending at the bottom and supporting at its center said container, a gasket interposed between said container and said strip, a collar in threaded engagement with the upper end of said cage and bearing on the neck of said container, and a resilient ring surrounding the neck of said container and receiving in a circumferential groove the upper edge of said collar.

4. For use with a container, a cylindrical cage loosely surrounding said container and being open at the top and bottom, said cage terminating in a flaring bottom portion, means extending diametrically at the bottom for supporting said container, a gasket interposed between said container and said supporting means, a collar in threaded engagement with the upper end of said cage and bearing on the neck of said container to hold the latter in centered position with respect to said cage.

In witness whereof I affix my signature.

CHARLES E. BULTMAN.